United States Patent Office 2,812,377
Patented Nov. 5, 1957

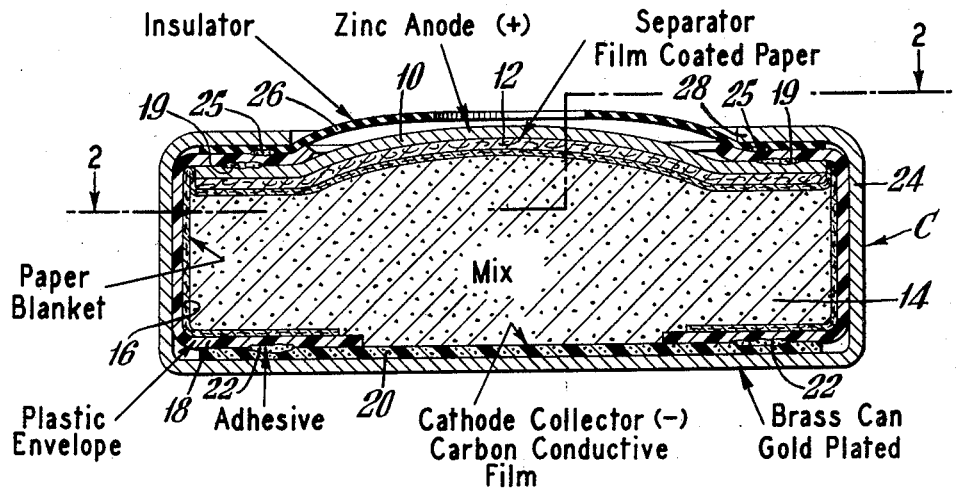
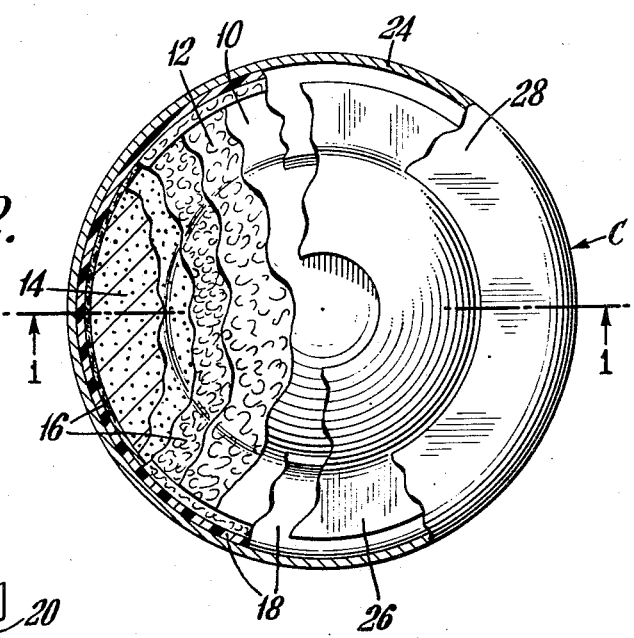
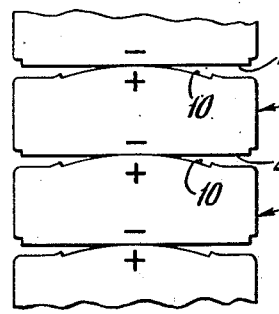

2,812,377

FLAT DRY CELL

John V. Franquemont, Lakewood, Ohio, assignor to Union Carbide Corporation, a corporation of New York Application November 23, 1955, Serial No. 548,722

10 Claims. (Cl. 136—111)

This invention relates to a flat dry cell, referring more particularly to a dry cell unit capable of manufacture in extremely small size.

Recent developments in the fields of electronics and electrically powered instruments have created a demand for dependable miniature batteries. Among the requirements of such batteries are that they be leak-resistant and have long life under varying conditions of service.

It is the principal object of this invention to satisfy this demand. More specifically, it is an object of the invention to provide a long life, leak-resistant dry cell capable of delivering its expected service life under varying conditions. Other objects will become apparent from the following description.

The invention will be described with reference to the accompanying drawings, in which:

Fig. 1 is a vertical section of a dry cell embodying the invention;

Fig. 2 is a view taken on the line 2—2 of Fig. 1 looking in the direction of the arrows; and Fig. 3 is a representation of a battery composed of a plurality of the cells shown in Fig. 1 arranged in series relationship.

In accordance with the invention a substantially flat dry cell comprises the following elements: a consumable metal anode, suitably of zinc; a separator having a bibulous portion adjacent to and in contact with the anode; a depolarizer mix-cake, suitably of manganese dioxide and comminuted conductivity enhancing material such as graphite or a black; a bibulous paper blanket overlying the peripheral edges of said anode and mix-cake and at least the surface of said mix-cake which is adjacent to said separator. A resilient integument of electrically insulating plastic material embraces the enumerated elements and, having in-turned marginal edges, serves to hold the cell elements together as a unit. A cathode collector composed of a resilient electrically-conductive film material is provided in contact with the surface portion of the mix-cake opposite that which is covered by the blanket. The cell unit is contained in a metal cup the open end of which is folded inwardly to compress the cell unit under relatively heavy pressure.

Referring to the drawing, there is illustrated in Fig. 1 a cell C embodying the invention. The elements of the cell include a metal anode 10, conventionally of zinc. Adjacent to the anode 10 is a separator 12 the anode-contacting portion of which is of a bibulous material such as alkyl cellulose ether, specifically methyl cellulose for example. Underlying the separator 12 and enveloping at least the edges of a depolarizer mix-cake 14 is a bibulous paper blanket 16. The mix-cake 14 is suitably composed of manganese dioxide and a comminuted conductivity enhancing material, such as graphite or a black, for instance acetylene black.

The anode 10, separator 12, blanket 16 and mix-cake 14 are held together as a unit by an envelope 18 composed of an integument of a resilient, electrically-insulating plastic material for instance a vinyl polymer, having in-turned marginal portions embracing the cell elements and adhesively sealed to the anode 10 as shown at 19. A cathode collector 20 composed of a resilient, electrically conductive plastic material is in electrical contact with the mix-cake 14, and is sealed to the inturned marginal portions of the integument 18, by adhesive as shown for instance at 22 (Fig. 1) or by heat-sealing. The cathode collector 20 is preferably composed of a film-forming vinyl polymer loaded with carbonaceous material to render it electrically conductive.

The entire unit just described is contained in a metal cup 24, suitably of brass and preferably plated internally and externally with gold or other noble metal. Within the cup 24 and above the anode 10 is an electrically-insulating washer 26, preferably composed of a vinyl polymer film-forming material and preferably adhesively sealed to the in-turned marginal edges of the integument 18 as shown at 25. The open end of the cup 24 is folded inwardly as shown at 28 so as to compress the cell elements and maintain them under heavy pressure and in intimate contact with each other.

In manufacturing a cell embodying the invention an anode is provided from a sheet of anode metal, usually zinc. To this may be adhered a separator, and a sheet of bibulous paper to form the blanket may be applied to the separator. A pre-molded mix-cake wet with electrolyte may then be positioned on the paper sheet which may then be folded about the edges of the mix-cake. The nonconductive integument may then be placed about the cell elements in conventional fashion, and the cathode collector placed in contact with the mix-cake and secured to the integument. The unit cell is now complete and is inserted into a metal cup. An insulating washer may be applied over the anode, and the edges of the metal cup folded inwardly and down upon the cell unit. This folding or crimping operation applies sufficient pressure to the cell unit to deform it to fill all voids in the cup. Also the anode is deformed, the central portion being distended to a dome shape, the marginal portions being held so that a flange surrounds the dome-shaped area. To form a battery of cells, it is necessary only to stack the cells, as shown in Fig. 3 for example.

A number of Leclanche type cells embodying the invention have been manufactured and tested. Such tests have demonstrated that the cell of the invention is leak-proof, has excellent shelf life and delivers good service under a variety of conditions.

For example, cells of a diameter of 0.440 inch and a height of ⅛ inch have been produced. These cells weigh about 1.4 grams and have a volume of 0.31 cc. Based on a large number of tests the rated capacity of such a cell to a voltage end-point of 1.3 is 60 milliampere-hours when discharged at continuous starting drains based on a nominal voltage of 1.5 volts of 100 microamperes or less. Actual life to 1.0 volt of test cells has been found to be about 740 hours on continuous 100 microampere drain, about 1150 hours on 60 microampere drain, about 2900 hours on 30 microampere drain, about 6700 hours on 10 microampere drain, and over 10,000 hours on 7 microampere drain. These tests were conducted at 70° F. In no case was there any trace of leakage during or after test. Tests conducted on cells stored 12 months at 21° C. showed them to have a current maintenance of 95% indicating excellent shelf stability.

These and other data recommend the use of the cell of the invention in applications where low drains for protracted periods of time are encountered and where only limited space is available. One such application is a battery-operated watch or other time piece.

The provision of gold surfaces on the cup protects it against oxidation or corrosion from the surrounding atmosphere and also offers a measure of protection for the cup against attack by any cell constituent or reaction product.

The domed surface attained on the anode strengthens the cell and renders it substantially immune to dimensional change.

I claim:

1. A substantially flat dry primary cell comprising as elements thereof a consumable metal anode; a separator having a bibulous, anode-contacting portion; and a depolarizer mix-cake wet with electrolyte, the peripheral edges of said mix-cake and the surface thereof adjacent to said separator being covered with a bibulous paper blanket; a resilient integument of electrically insulating material enveloping the peripheral edges of the enumerated cell elements; a cathode collector composed of a flexible, electrically-conductive film material in contact with the surface of said mix-cake opposite to that covered by said blanket; said integument having in-turned marginal edges; said cathode collector being secured to said integument, said integument and said collector thereby holding said cell elements together as a unit; said unit being contained in a metal cup the open end of which is folded inwardly to compress said unit and to hold the same in said cup under pressure; said cup making electrical contact with said cathode collector and serving as the external cathode terminal of said cell, but being electrically insulated from said anode, the inwardly folded end of said cup leaving a portion of said anode exposed for electrical connection thereto.

2. A dry cell as defined in claim 1 in which a resilient, electrically-insulating washer overlies said anode and underlies said inwardly folded end of said cup.

3. A dry cell as defined in claim 2 in which said anode is substantially dome-shaped.

4. A dry cell as defined in claim 3 in which said dome-shaped anode has a peripheral flange.

5. A dry cell as defined in claim 1 in which the surface portions of said metal cup are of non-corrodible metal.

6. A dry cell as defined in claim 5 in which said surface portions of said cup are of gold.

7. A dry cell as defined in claim 1 in which said separator is of paper and said anode-contacting portion is an alkyl cellulose ether.

8. A dry cell as defined in claim 1 in which said cathode collector is sealed to in-turned marginal edges of said integument thereby forming with said integument a sack for said cell element yieldable under pressure applied by said inwardly folded end of said cup.

9. A dry cell as defined in claim 1 in which said cup is filled substantially without voids by said unit.

10. A dry cell as defined in claim 1 in which in-turned marginal edges of said integument are adhesively sealed to said anode.

References Cited in the file of this patent

UNITED STATES PATENTS

| | | |
|---|---|---|
| 2,591,355 | Heraud | Apr. 1, 1952 |
| 2,593,893 | King | Apr. 22, 1952 |